Patented May 27, 1941

2,243,296

UNITED STATES PATENT OFFICE 2,243,296

FILTER ELEMENT AND METHOD OF MAKING THE SAME

Ernest J. Sweetland, Piedmont, Calif.

No Drawing. Application June 1, 1938,
Serial No. 211,185

4 Claims. (Cl. 210—204)

This invention relates to a method and process of manufacturing filter elements which are especially adapted for use in the filtration of oil. It is particularly adapted to use in oil filters used for the clarification or refining of oil in the oil circulatory system of internal combustion engines.

Oil in the circulatory system of internal combustion engines becomes foul from continued use due to the accumulation of carbonaceous matter, minute particles of metal worn from the wearing parts of the engine and from road dust, etc. In addition to these impurities, moisture sometimes accumulates in the oil either free or in emulsified form. When filters are used to remove the suspended impurities from the oil it often happens that a considerable amount of moisture accumulates in the filter casing. Filter elements made of paper can be successfully used in filtering crank case oil when there is no moisture present, but when moisture accumulates in the filter casing, paper filter elements tend to disintegrate due to the action of the moisture coupled with the agitation produced by the motion of the car and the circulation of oil through the filter casing. It is one of the objects of my invention to provide an inexpensive paper filter element that is so treated as to make it resistant to the action of moisture.

The oil mixture in the circulatory system of internal combustion engines sometimes contains acid which may be present due to faulty refining methods in the oil or fuel used in the engine or to other causes. The acid may be present in the oil or in the moisture carried with it or in both. In any event, it is damaging to the fine polished wearing surface of the engine.

It is one of the objects of my invention to provide a filter medium which serves the double purpose of filtering the oil and simultaneously neutralizing any acidity that might be present. It is pointed out that the necessary alkalinity to neutralize any acidity that might be present in the oil is, in accordance with my invention, contained throughout the entire body of the filter elements so that it is impossible for the oil to pass through the filter elements without the acidity being neutralized. In this respect my invention has great advantages over purifying devices containing alkaline material in lump or granular form which soon become coated with slimy residual matter deposited from the oil, after which the alkalinity is for all practical purposes unavailable, as the oil channels its way past the slimy-coated particles without the acidity being neutralized.

As will be seen by the following description, my invention provides a filter element made of paper or similar fibrous material that is strengthened so that it will stand handling without injury, will withstand the action of moisture and will neutralize the oil simultaneously with the removal of suspended impurities. Filters have heretofore been constructed that would maintain clarity of the oil circulatory system for an indefinite period of time but the use of such filters has been discouraged to a certain extent by the contention that even though the clarity is maintained the oil should be discarded at intervals because of the gradual formation of acids in the oil mixture. Since my filter not only removes suspended impurities and moisture but neutralizes the acidity it makes it possible to use the oil for an indefinite period without discarding, it merely being necessary to add sufficient new oil from time to time to keep up the necessary volume.

In the simplest form of my invention I use any type of porous filter paper or fiber-board which is porous in character. I prefer to use a long-fiber type of blotting paper or other porous paper or wood pulp product which may vary from $\frac{1}{20}$ of an inch in thickness up to $\frac{1}{8}$ or $\frac{1}{6}$ of an inch in thickness. $\frac{1}{8}$ of an inch in thickness gives very satisfactory results and when I use thinner material I may make the filter elements with two or more layers stitched or otherwise held together. An example of one shape and form of filter element and filter casing that is applicable for use in connection with the present invention is shown in my co-pending application Serial No. 171,035 entitled Filters and filed October 26, 1937.

My invention in its simplest form consists of impregnating the paper or other fibrous material with an alkaline silicate such as sodium or potassium silicate, then drying the filter element and subjecting the same to heat which renders a very considerable portion of the alkaline silicate insoluble.

While I prefer to subject the filter elements to the baking process during the course of manufacture and promptly after the elements have dried, such baking is not absolutely essential, particularly when the elements are to be used for the filtration of hot oil, for I find that when the elements are submerged in hot oil for a protracted period of time, the result is quite similar to that obtained by baking the elements in an oven. In fact, the elements may be treated in hot oil for a period ranging from one to several hours, if desired, in place of the ordinary baking process. In carrying out my process, whether an oil bath or dry heat be used as a means of rendering a portion of the sodium silicate insoluble, I prefer to use a temperature ranging from 225° up to 325° F. Satisfactory results may be obtained anywhere within this range. At the lower temperature I prefer to bake the elements for from two hours upward. If higher temperatures are used, the baking time may be shortened if necessary, but the degree of heat that may be used and the time of baking is limited only by the degree which the fiber will stand without injury.

Elements made of fibrous material, such as paper pulp, become very soft and flexible when saturated with a solution of sodium silicate and the same elements become quite stiff and rigid after they are dried. It is therefore possible to form the elements into any desirable shape while they are in moist condition and to allow them to set in the desired shape while drying. By this means the paper is readily formed into elements of flat, cylindrical or star-shaped cross-section; and if a metallic supporting or drainage member, such as a wire screen, is required, the moistened paper in plastic condition is placed upon or about the screen in the required manner. When this procedure is followed, the moistened paper adheres so intimately to the screen as to make a very substantial reinforced construction when the elements are dried and baked.

A very satisfactory type of element is the disc type referred to above in Figures 2, 3, 4 and 5 of my application Serial No. 171,035. A satisfactory procedure in manufacturing elements of this type is to cut out the paper into disc shape with a central drainage opening and mount the discs either with or without spacing washers upon a central shaft which passes through the drainage opening in the middle of the discs. A large number of the discs are dipped in the sodium silicate solution either before or after assembling them upon the shaft and then the shaft with its assembly of elements is rotated at sufficiently high speed, say 1,000 R. P. M. or more, and the surplus solution is thrown off by centrifugal force, leaving a sufficient amount of sodium silicate solution absorbed by the elements to fulfill the requirements of providing strength and alkalinity to the discs. There are various concentrations and grades of sodium silicate on the market and I have found that the product known as "U-Brand" sodium silicate manufactured by the Philadelphia Quartz Company and the "N-Brand" manufactured by the same company give satisfactory results. In either case I prefer to use a mixture of 30% or 40% of the sodium silicate mixed with water.

If the elements above described were spaced upon the shaft with washers before spinning out the surplus fluid, they may be dried and baked while still assembled on the shaft, but if they are placed on the shaft in a cylindrical assembly without washers between, the elements are separated before drying and baking. If it is desired to have the finished elements perfectly flat, they may be packed between metal plates or screens to hold them flat during the baking process.

If the elements are of such shape that they do not lend themselves to the centrifugal method of removing the surplus moisture the same may be removed by running the elements between wringers, or good results may be obtained by merely allowing them to drain and dry after dipping. The decision as to whether or not to remove the surplus solution by wringing or spinning depends largely upon the concentration of the solution used. Generally speaking, if a very dilute solution is used, then it may be preferable to dry the elements without removing the surplus other than by allowing the elements to drain.

While I have referred to solutions of 30 to 40% concentration, I do not limit myself to any particular strength of solution because the strength depends entirely upon the nature of the paper used and the result to be attained. If the paper is of a very close-grain structure much more dilute solutions might be desired but in any case the procedure should be so conducted that a sufficient amount of sodium silicate permeates the mass of the paper to cement the fibers together without closing the interstices that are necessary for successful filtration.

The foregoing relates to the simplest form of my invention; namely, that of impregnating a fibrous filter medium with sodium silicate and then drying the same and subjecting it to heat in order to render a considerable percentage of the sodium silicate or its derivatives insoluble, whereby a filter element is produced that has considerable physical strength, good filtering properties and an alkaline reaction sufficient to neutralize the acids with which it may come in contact in the filtration of crank case oil. In this connection it is pointed out that the alkaline products thus deposited in the filter element are insoluble in oil but are acted upon when brought in intimate contact with any acid that may be present. The alkaline reaction therefore persists for as long a time as necessary, for such filter elements are inexpensive and designed to be discarded and replaced by fresh ones from time to time.

A modified form of my invention consists of impregnating a fibrous filter medium such as paper, paper pulp or like fibrous material with an alkaline silicate such as sodium silicate and then treating the filter medium with a chemical which reacts upon the sodium silicate to convert a portion of the sodium silicate into a silicate having a different base; or, of treating the filter medium impregnated with sodium silicate with an acid which liberates at least a portion of the silica in the form of silica-gel, which, after being dried, and baked is highly absorbent and insoluble in water. Examples of this procedure are as follows: A fibrous filter element such as blotting paper may be dipped in sodium silicate solution, for instance 40% "U-Brand" or "N-Brand" above referred to mixed with 60% water, then removed from the solution. This may have some of the surplus removed by methods above described or not, as desired. If this filter element is now dipped in a solution (say 10%) of sulphate of iron, the iron sulphate reacts with the sodium silicate to form sodium sulphate and iron silicate, the latter being in the nature of a gelatinous precipitate which is formed not only upon the surface of the filter element but is created within the fibrous structure of the paper where it remains permanently, acting as a filter medium and reinforcing agent for the paper. A similar procedure may be carried out using aluminum sulphate in place of iron sulphate in which event aluminum silicate is formed upon the surface and within the texture of the paper. By similar procedures magnesium sulphate or calcium chloride may be used with the result that magnesium or calcium silicate is formed within the paper structure.

If it is desired to convert a portion or all of the silica that has been absorbed by the paper into silica-gel, then the filter element after being treated with sodium silicate solution of any desired strength, and the surplus solution having been removed, the element is treated with a dilute solution of acid, such as hydrochloric acid, after which the surplus acid may be washed out and the element dried and baked. I may refer to the use of iron sulphate, aluminum sulphate, calcium chloride, magnesium sulphate, etc. as a secondary chemical treatment of the filter medium. Obviously, many other chemicals might be used with corresponding results; namely, that of converting the sodium silicate into a silicate of some other base. Likewise, when acid is used as the secondary treatment, various other acids than hydrochloric might be used with the formation of silicic acid or silica-gel in the structure of the filter element. The examples given are merely typical and are not by any means to be regarded as being all inclusive.

Regardless of what secondary treatment I might use, I prefer in any case to use only a sufficient amount of the secondary chemical to react with a portion of the absorbed sodium silicate, as it is desirable to retain the alkaline reaction of the element and also to retain the adhesive properties imparted by the sodium silicate, especially when an acid treatment is used. I therefore prefer, when using a secondary treatment, first to impregnate the filter element or the filter medium with sodium silicate, say of 40% concentration in water, then remove the surplus solution either by wringing or spinning. I then apply the secondary chemical by quickly dipping in the secondary solution and removing before the solution penetrates through the entire element or medium. Alternatively I may spray the secondary chemical on the surface of the element that has been dipped in sodium silicate solution and the surplus solution removed. By either method, I obtain a filter element which is thoroughly impregnated with the sodium silicate and wherein the innermost portion of the element remains unaltered while the outer surface which has been penetrated by the secondary chemical is altered according to the chemical used. Thus, the finished product consists of a fibrous element having an inner stratum reinforced with sodium silicate while the outer surfaces are bonded with a silicate having a base other than sodium but having a silicate radical. When acid treatment is used to convert the outer layers into silica-gel, the fibers and the silica-gel are bonded together and thereby the maximum advantages of silica-gel as a filter medium are gained. Regardless of what secondary chemical treatment is used, when this procedure is followed the alkalinity of the element is preserved and I prefer in all cases to bake the elements after drying unless it is known that when they are placed in use for filtering oil, the temperature of the oil will be sufficient to render a large percentage of the silicate insoluble.

For certain special purposes where sodium silicate only is used, the adhesive properties of this material may be used as a means of cementing a filter aid such as kieselguhr or activated carbon to the surface of the elements.

Sodium silicate and similar products may contain considerable caustic alkali that is uncombined with silica and this is naturally retained in the filter element or medium and serves to neutralize acid when present in the oil mixture. If desired, caustic alkali treatment of the filter medium may be used in addition to or independent of the sodium silicate treatment for purposes of neutralizing acidity in the oil being filtered.

Paper and pulp, wood pulp, cellulose fibers in various forms may be used satisfactorily in my method. Whatever fiber is used the process is applicable, and the fiber may be in sheets or in various moulded forms that lend themselves to use as filter elements.

Where I refer to a material being soluble or insoluble throughout this specification I refer to solubility in water.

While I have described typical methods of carrying out my invention I do not limit myself to the specific methods described but only by the limitations of the following claims.

I claim:

1. A method of making a filter medium which comprises impregnating a fibrous material with an alkaline silicate, and then treating the filter medium thus impregnated with a chemical having a metallic base.

2. A method of making a filter medium which comprises impregnating a fibrous material with an alkaline silicate, then treating the external surface of said medium with a chemical having an acid radical; said chemical being allowed to penetrate only a portion of the thickness of said filter medium; then drying said filter medium whereby the finished filter medium comprises a fibrous body the interior of which is impregnated with an alkaline silicate while the exterior surface thereof is coated with a precipitate of silica-gel.

3. A method of making a filter medium which comprises impregnating a fibrous material with an alkaline silicate, and then treating the filter medium thus impregnated with a chemical having a metallic base and capable of reacting with said alkaline silicate to form a siliceous precipitate upon the surface of said element; said chemical with a metallic base being allowed to penetrate only a portion of the thickness of said filter medium whereby the finished filter medium has the interior thereof impregnated with an alkaline silicate while the exterior is coated with a siliceous precipitate having a metallic base.

4. A method of making a filter medium which comprises subjecting a body of fibrous material having a cake-forming filter surface to impregnation by a solution containing an alkaline silicate, and then subjecting the outer surface of said medium to the action of a chemical to react with said alkaline silicate to form a siliceous precipitate within the pores of said cake-forming surface, and then drying said filter medium so that the alkaline silicate remains unprecipitated in the interior of said filter medium and thus forms a binder to hold the fibrous material together while the outer cake-forming surface is coated with a pulverulent siliceous precipitate to act as a filter aid.

ERNEST J. SWEETLAND.